(12) United States Patent
Ertl et al.

(10) Patent No.: US 12,013,375 B2
(45) Date of Patent: Jun. 18, 2024

(54) METHOD AND MEANS FOR TESTING THE STRENGTH OF A BONDING BETWEEN TWO SPECIMEN ELEMENTS

(71) Applicant: TECHNISCHE UNIVERSITAT WIEN, Vienna (AT)

(72) Inventors: Peter Ertl, Vienna (AT); Mario Rothbauer, Pfaffstatten (AT); Sebastian R. A. Kratz, Frankfurt am Main (DE)

(73) Assignee: TECHNISCHE UNIVERSITAT WIEN, Vienna (AT)

( * ) Notice: Subject to any disclaimer, the term of this patent is extended or adjusted under 35 U.S.C. 154(b) by 512 days.

(21) Appl. No.: 17/290,307

(22) PCT Filed: Oct. 31, 2019

(86) PCT No.: PCT/AT2019/060362
§ 371 (c)(1),
(2) Date: Apr. 30, 2021

(87) PCT Pub. No.: WO2020/087102
PCT Pub. Date: May 7, 2020

(65) Prior Publication Data
US 2021/0372896 A1 Dec. 2, 2021

(30) Foreign Application Priority Data

Oct. 31, 2018 (AT) .................. 50933/2018

(51) Int. Cl.
*G01N 3/08* (2006.01)
*G01N 3/04* (2006.01)
*G01N 3/24* (2006.01)

(52) U.S. Cl.
CPC ............... *G01N 3/04* (2013.01); *G01N 3/08* (2013.01); *G01N 3/24* (2013.01); *G01N 2203/0017* (2013.01)

(58) Field of Classification Search
CPC .. G01N 3/04; G01N 3/08; G01N 3/24; G01N 2203/0017; G01N 2203/0272; G01N 2203/0298; G01N 19/04; G01N 3/22; G01N 2203/0025
USPC .......................... 73/827, 831, 834, 842, 845
See application file for complete search history.

(56) References Cited

U.S. PATENT DOCUMENTS

2005/0193829 A1   9/2005  Brinz

FOREIGN PATENT DOCUMENTS

| CN | 107290217 A | * | 10/2017 | |
|----|----|----|----|----|
| EP | 582437 A2 | * | 2/1994 | ............. G01N 19/04 |
| EP | 2293041 A2 | * | 3/2011 | ............... G01N 3/02 |

OTHER PUBLICATIONS

International Preliminary Report on Patentability received for PCT Patent Application No. PCT/AT2019/060362, mailed on May 14, 2021, 9 pages.

(Continued)

*Primary Examiner* — Robert R Raevis
(74) *Attorney, Agent, or Firm* — Workman Nydegger

(57) ABSTRACT

The present invention relates to transmission elements (1, 1a, 1b; 12, 12a, 12b) for testing/determining the tensile or shear strength of a bonding between two elongated shaped specimen elements by transmitting a tensile or shear force (10, 22) to a specimen element (5a, 5b; 12a, 12b).

10 Claims, 2 Drawing Sheets

(56) References Cited

OTHER PUBLICATIONS

International Search Report and Written Opinion received for PCT Patent Application No. PCT/AT2019/060362, mailed on Jan. 24, 2020, 10 pages.
International Search Report issued in PCT/AT2019/060362 dated Jan. 24, 2020.

* cited by examiner

METHOD AND MEANS FOR TESTING THE STRENGTH OF A BONDING BETWEEN TWO SPECIMEN ELEMENTS

CROSS REFERENCE TO RELATED APPLICATIONS

This application is a 371 application of International Patent Application No. PCT/AT2019/060362, filed Oct. 31, 2019, which claims the benefit of Austrian Patent Application No. 50933/2018, filed Oct. 31, 2018, which are incorporated by reference in their entirety.

BACKGROUND

The present invention relates to methods and means for testing the strength of a bonding between two specimen elements and a transmission element for transmitting a force to a specimen element.

Microfluidic devices have to meet certain requirements in relation to stability. One requirement, which has to be met, is for example that the microfluidic devices need to be leakproof at all kinds of loads applied during operation and handling of the microfluidic devices. In this regard, especially the bonding areas, where different parts of the microfluidic devices are bonded by an adhesive or chemical or physical bonding agent, many show leaks when excessive loads are applied. In particular, microfluidic devices having parts of materials, which are difficult to bond due to their chemical characteristics, e.g. with hybrid-chips, show leaks when excessive loads are applied. Due to that, it is very important to select the right adhesive or chemical or physical bonding agent to ensure a high quality of bonding of the parts of the microfluidic devices.

Accordingly microfluidic devices and particularly the bonding areas of microfluidic devices are currently tested before they are sold and used in laboratories. In these tests, parts of the microfluidic devices are pulled apart by a universal testing machine in such a way that tensile and/or shear forces are applied to the microfluidic devices, wherein the maximum allowable shear force and/or tensile force are determined up to which a microfluidic device tends to remain leak-proof and/or keeps its physical integrity.

Microfluidic devices typically comprise different parts composed of the same or different materials bonded together, for instance, by an adhesive. In order to test the bonding of these materials test mechanisms have been developed. In these test mechanisms an adhesive or bonding agent is applied on two specimen elements of the same material or of different materials to bond them together. The specimen elements are clamped in a universal testing machine so that tensile and shear forces can be applied and measured independently.

With this test mechanisms it is possible to focus on material specific properties and differences in the measured results due to design variations of the microfluidic devices can be eliminated. Material specific properties are e.g. bonding quality of specimen elements of the same or of different materials bonded with different bonding agents or bonded using different bonding processes, environmental conditions such as temperature, humidity, surface roughness, etc.

Universal testing machines with a sufficiently fine measuring range for carrying out the above described tests are very expensive and complex and therefore not available in most laboratories. Thus, it is desirable to determine the strength of a bonding using testing machines other than the aforementioned universal testing machines such as simple press testing machines. However, conventional force transmission elements used to determine the strength of a bonding by applying tensile and shear forces cannot be used in press testing machines. Thus, novel transmission elements are required to test the strength of a bonding, for instance mediated by adhesives on preferably different materials using such testing machines.

SUMMARY

Therefore, it is an object of the present invention to provide a method to avoid the drawbacks of the state of the art and in particular to provide a method for testing tensile and/or shear strengths of a bonding between two specimen elements without using universal testing machines.

These and further advantageous embodiments of the invention will be explained based on the following description and the accompanying drawings. The person skilled in the art will understand that various embodiments may be combined.

DETAILED DESCRIPTION

Figure 1:
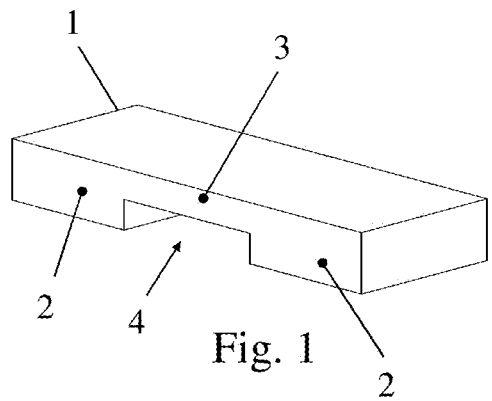
FIG. 1 shows in an isometric view an embodiment of a transmission element according to a first aspect of the invention.

A first aspect of the present invention relates to a transmission element for testing/determining the tensile strength of a bonding between two elongated shaped specimen elements by transmitting a force applied by a press to a specimen element. The transmission element is essentially U-shaped having two legs and a connecting element, wherein the two legs are arranged essentially parallel and spaced apart to each other and connected by the connecting element forming a groove. The legs are engageable with the specimen element and the connecting element is engageable with a press, wherein a force applied by the press on the connecting element is transmitted to the specimen element.

One major advantage of the transmission element according to the first aspect of the present invention is the fact that it allows, preferably combined with a second transmission element, to determine the tensile strength of a bonding or adhesive using a simple testing machine, e.g. a manual, hydraulic, mechanical or pneumatic press. The technical properties of the transmission element according to the first aspect of the present invention allow to apply a tensile force on a specimen element although the testing machine applies pressure. This is particularly advantageous because it allows using testing machines of any kind which apply pressure to a specimen, preferably testing machines which are only capable to apply pressure. The fact that the testing machine may only apply pressure to specimen elements bonded to each other in order to determine the tensile strength is also advantageous because it is not necessary to clamp the specimen elements in a universal testing machine. Especially with specimen elements of brittle material it is very advantageous that the specimen elements do not need to be clamped for determining the tensile strength of a bonding or adhesive bonding two specimen elements, since specimen elements of brittle material can easily break.

Presses are widely used in laboratories, machine shops and manufacturing companies, since they are cheaper and can be used for a wide variety of applications that actually generate the pressure during bonding or adhesive gluing processes throughout microfluidic device manufacturing. Therefore in most cases it is not necessary to purchase an extra machine or equipment to carry out the methods according to the invention for testing the strength of the adhesives.

The transmission element of the present invention may be made of any material which is usually used to manufacture such elements. However, according to a preferred embodiment of the present invention the transmission element according to the first aspect of the present invention is made from metal or polymers and is preferably 3D-printed, laser sintered, or CNC milled.

Especially with 3D-printing, the transmission element can be produced in a very cost efficient manner. In particular, with 3D-printing it is easy to print different sized transmission elements in a fast and cost efficient manner, whereby it is possible to use different sized specimen elements.

Another aspect of the present invention relates to a method for testing/determining the tensile strength of a bonding between two elongated shaped specimen elements comprising the steps of:
a) providing two transmission elements for testing/determining the tensile strength of a bonding between two elongated shaped specimen elements according to the first aspect of the invention according to the present invention as identified above;
b) bonding two elongated shaped specimen elements crosswise at bonding areas by means of an adhesive, for instance, wherein the bonding area of each specimen element is situated between two protrusion areas on the specimen element and wherein in the bonding areas the specimen elements overlap each other;
c) engaging each transmission element with one specimen element by means of the legs of the transmission element via the protrusion areas of the specimen element, so that each specimen element is placed with its bonding area in the groove of one transmission element;
d) applying a force, preferably a pressing force, on the connecting element of each transmission element with a press, wherein the forces are directed towards each other essentially in one action line forcing the transmission elements towards each other and applying a tensile force on the bonding; and
e) measuring the force applied with a force measurement device.

Due to the essentially U-shaped form of the transmission elements according to a first aspect of the invention it is possible—by using two of them—to test the strength, in particular the resistance to tensile forces, of a bonding, preferably an adhesive bonding, two specimen elements in a crosswise manner via a press. By using a press, the specimen elements do not need to be clamped to carry out the test, eliminating the need for special attention to a connection between the specimen element and the transmission element. The specimen elements are held in place just by the forces applied by the press.

The force applied to the transmission elements can be measured using methods and devices known in the art such as piezo sensors, pressure-sensitive hydrogel/polymer layers and sheets, hydraulic or air pressure based devices (e.g. barometer).

The terms "testing" and "determining", as used herein, can be used interchangeably. Both terms refer to the identification of quantitative or qualitative parameters of a tensile and/or shear strength of a bounding between two specimen elements. The unit of both parameters is Newton and indicates the force to be applied leading to structural failure of one or both specimen elements.

"Tensile strength", as used herein, is defined as a stress, which is measured as force per unit area. This area is the area where the two specimen elements are bound together. Tensile strength is determined by applying a force pulling two specimen elements apart.

"Shear strength" is determined by applying a force that tends to produce a sliding failure on a material along a plane that is parallel to the direction of the force.

Preferably, the specimen elements are bonded crosswise at an angle $\alpha$ of 90° between longitudinal axes of the elongated shaped specimen elements. It should be noted that the specimen elements can also be bonded crosswise at an angle $\alpha$ between 25° and 155°, preferably between 30° and 150°, more preferably between 40° and 140°, more preferably between 50° and 130°, more preferably between 60° and 120°, more preferably between 70° and 110°, more preferably between 80° and 100°, more preferably between 85° and 95°, in particular 90°.

Advantageously the forces are applied to the transmission elements without holding or fixing the specimen elements. However, it is also possible that the transmission elements have a framing which prevents the specimen elements from getting out of place during the application of the force on the connecting element of each transmission element via the press. The framing is for example built by protrusions, which protrude from the transmission elements. However, a major advantage of the method of the present invention is that the specimen elements do not have to be fixed or held tightly within the testing machine. Thus, in a preferred embodiment of the present invention no fastening means for the attachment of tensile testing specimens in the testing machine are required. In contrast thereto, the use of universal testing machines to determine or test the tensile strength of a bonding between two specimen elements always requires fastening of the elements within the machine.

A second aspect of the present invention relates to a transmission element for testing/determining the shear strength of a bonding between two elongated shaped specimen elements by transmitting a force applied by a press to a specimen element. The transmission element has a recess for overlaying at least a part of the specimen element, wherein the transmission element comprises an opening area and a connecting area opposite the opening area and wherein an opening of the recess opens in the opening area and the connecting area is engageable with the press.

One major advantage of the transmission element according to the second aspect of the present invention is the fact that it allows, preferably combined with a second transmission element, to determine the shear strength of a bonding or adhesive using a simple testing machine, e.g. a manual, hydraulic, mechanical or pneumatic press. The technical properties of the transmission element according to the second aspect of the present invention allow to apply a shear force on a specimen element although the testing machine applies pressure. This is particularly advantageous because it allows using testing machines of any kind which apply pressure to a specimen, preferably testing machines which are only capable to apply pressure. The fact that the testing machine may only apply pressure to specimen elements bonded to each other in order to determine the shear strength is also advantageous because it is not necessary to clamp the specimen elements in a universal testing machine. Especially with specimen elements of brittle material it is very advantageous that the specimen elements do not need to be clamped for determining the shear strength of a bonding or adhesive bonding two specimen elements, since specimen elements of brittle material can easily break.

Preferably the transmission element according to the second aspect of the invention is made from metal or polymer and is preferably 3D-printed, laser sintered or CNC milled. Especially with 3D-printing, the transmission element can be produced in a very cost efficient and simple manner.

Another aspect of the present invention relates to a method according to the invention for testing/determining the shear strength of a bonding between two elongated shaped specimen elements comprising the steps of:
a) providing two transmission elements for testing/determining the shear strength of a bonding between two elongated shaped specimen elements according to the first aspect of the invention according to the present invention as identified above;
b) bonding said two specimen elements in a partially overlapping parallel way at bonding areas by means of an adhesive, for instance, forming a specimen, wherein an exposed section is formed at each specimen element and wherein the exposed sections are formed at opposite sides on the specimen enclosing the bonding areas;
c) engaging each transmission element with one specimen element by overlaying each exposed section of the specimen element at least partly with the recess;
d) applying a force, preferably a pressing force, on the connecting area of each transmission element with a press, wherein the forces are directed towards each other essentially in one action line forcing the transmission elements towards each other and applying a shear force on the bonding; and
e) measuring at least one force applied with a force measurement device.

Due to the recess of the transmission elements according to the second aspect of the invention for overlaying at least a part of the specimen element it is possible—by using two of them—to test the strength, in particular the resistance to shear forces, of a bonding two specimen elements in a partially overlapping parallel way. By using a press, the specimen elements do not need to be clamped to carry out the test, eliminating the need for special attention to a connection between the specimen element and the transmission element. For carrying out the test, the transmission elements are just overlayed over exposed sections formed at opposite sides when the two specimen elements are bonded in a partially overlapping parallel way. Thereby, the bonded specimen elements are held in place, but are not clamped.

Preferably, the force measurement device is integrated in the press and includes a plurality of strain gauges, which are applied to, e.g. a framework of the press to measure the deformation when the forces are applied to the connecting elements/connecting areas of the transmission elements. In a further embodiment, with a hydraulic or a pneumatic press the forces applied to the connecting elements/connecting areas of the transmission elements are calculated from the pressure applied via the hydraulic press or the pneumatic press. In this embodiment the force measurement device is a manometer of the hydraulic or pneumatic press. In a further embodiment, the force measurement device can also be a load cell, which is integrated in the press or which is an external device. Preferably, the load cell comprises at least one sensor of the group consisting of a piezo sensor, an electronic sensor having at least one bimetal element and a chemical sensors having a pressure-sensitive hydrogel, polymer layers and sheets.

Preferably, the forces applied to the transmission elements are essentially vertically. Thereby it is insured that the specimen elements don't get jammed during testing the strength of the bonding.

The two specimen elements provided are for example made from glass, metal, wood and/or plastic.

Advantageously the press applies the forces on the transmission elements via a drive system which includes an electric motor with or without a transmission, a hydraulic cylinder, a pneumatic cylinder and/or a transmission drivable by hand.

Preferably the bonding agent is an adhesive, which is preferably selected from the group consisting of liquid adhesives, e.g. epoxide based adhesives, acrylate based adhesives, silicon based adhesives, double sided tape, self-assembly monolayers, e.g. APTES, MPTS, GPTMS, etc., ultra violet adhesive, cement, polyurethane foam, and any combinations thereof.

Furthermore, the invention relates to the use of two transmission elements according to the first aspect of the invention for testing the tensile strength of a bonding two elongated shaped specimen elements crosswise at bonding areas.

Furthermore, the invention relates to the use of two transmission elements according to the second aspect of the invention for testing the shear strength of an adhesive bonding two specimen elements in a partially overlapping parallel way at bonding areas.

Reference is now made to the drawings. FIG. 1 shows in an isometric view an embodiment of a transmission element 1 according to a first aspect of the invention. The transmission element 1 is essentially U-shaped having two legs 2 and a connecting element 3, wherein the two legs 2 are arranged parallel and spaced apart to each other and connected by the connecting element 3 forming a groove 4. The transmission element 1 is made from plastic and is 3D-printed.

Figure 2:
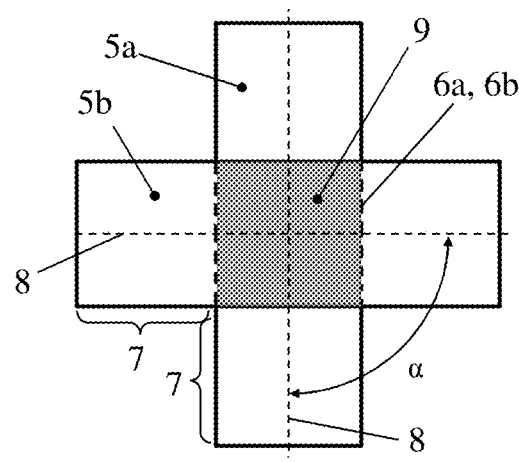
FIG. 2 shows two elongated shaped specimen elements bonded crosswise by means of an adhesive.

FIG. 2 shows two elongated shaped specimen elements 5a and 5b, which have the same form. The specimen element 5a has a bonding area 6a and the specimen element 5b has a bonding area 6b. The specimen elements 5a and 5b are bonded crosswise at the bonding areas 6a and 6b by means of an adhesive 9. The bonding area 6a or 6b of each specimen element 5a or 5b is situated between two protrusion areas 7 on the specimen element 5a or 5b, wherein in the bonding areas 6a and 6b the specimen elements 5a, 5b overlap each other. An angle α between longitudinal axes 8 of the elongated shaped specimen elements 5a and 5b is 90°.

Figure 3:
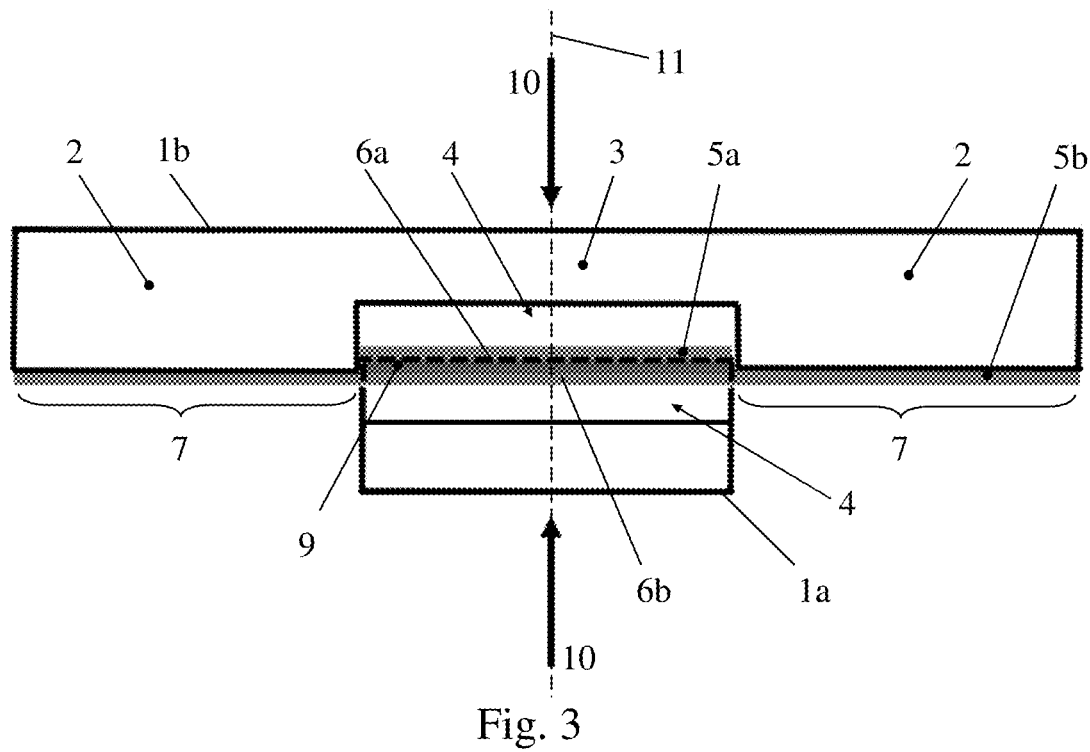
FIG. 3 shows in a cross sectional view testing of the strength of an adhesive bonding two specimen elements according to FIG. 2 including two transmission elements according to FIG. 1.

FIG. 3 shows in a cross sectional view testing of the strength of an adhesive 9 bonding two specimen elements 5a and 5b according to FIG. 2 including two transmission elements 1a and 1b according to FIG. 1.

The transmission element 1a is in contact with the protrusion areas 7 of the specimen element 5a via its legs 2. The transmission element 1b is in contact with the protrusion areas 7 of the specimen element 5b via its legs 2. Thereby, the specimen element 5a is placed with its bonding area 6a in the groove 4 of the transmission element 1b and the specimen element 5b is placed with its bonding area 6b in the groove 4 of the transmission element 1a.

Via a press not shown forces 10 are applied to the connecting elements 3 of the transmission elements 1a and 1b. The forces 10 are directed towards each other in one action line 11 forcing the transmission elements 1a and 1b towards each other and applying a tensile force on the adhesive 9. The forces 10 are measured with a load cell not shown to indicate at which tensile force 10 the adhesive 9 breaks.

In a further more preferred embodiment the press includes a distance measuring system to indicate an elongation of the adhesive 9 parallel to the tensile force applied to the adhesive 9.

Preferably the transmission elements 1a and 1b include a framing, which frames the specimen elements 5a and 5b during the application of force to the transmission elements 1a and 1b via the press. This has the advantage that the specimen elements 5a and 5b cannot get out of place during force application via the press. The framing is preferably built by protrusion protruding from the transmission elements 1a and 1b.

Figure 4:
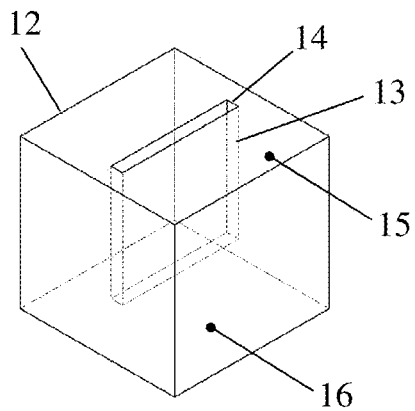
FIG. 4 shows in an isometric view an embodiment of a transmission element according to a second aspect of the invention.

FIG. 4 shows in an isometric view an embodiment of a transmission element 12 according to a second aspect of the invention. The transmission element 12 has a recess 13 comprising an opening 14 in an opening area 15. Moreover, the transmission element 12 has a connecting area 16 situated opposite the opening area 15. The transmission element 12 is made from plastic and is 3D-printed.

Figure 5:
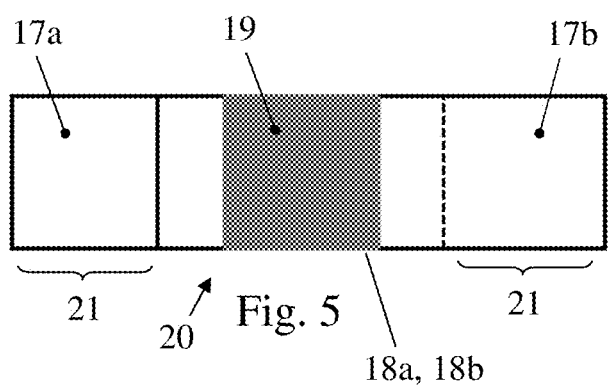
FIG. 5 shows two specimen elements bonded in a partially overlapping parallel way by means of an adhesive.

FIG. 5 shows two specimen elements 17a and 17b, which have the same form. The specimen element 17a has a bonding area 18a and the specimen element 17b has a bonding area 18b. The specimen elements 17a and 17b are bonded in a partially overlapping parallel way by means of an adhesive 19 applied in the bonding areas 18a and 18b forming a specimen 20. The bonding areas 18a and 18b extend either over the whole overlapping area or only over a part of the overlapping area. At each specimen element 17a and 17b an exposed section 21 is formed, wherein the exposed sections 21 are formed at opposite sides on the specimen 20 enclosing the bonding areas 18a and 18b.

Figure 6:
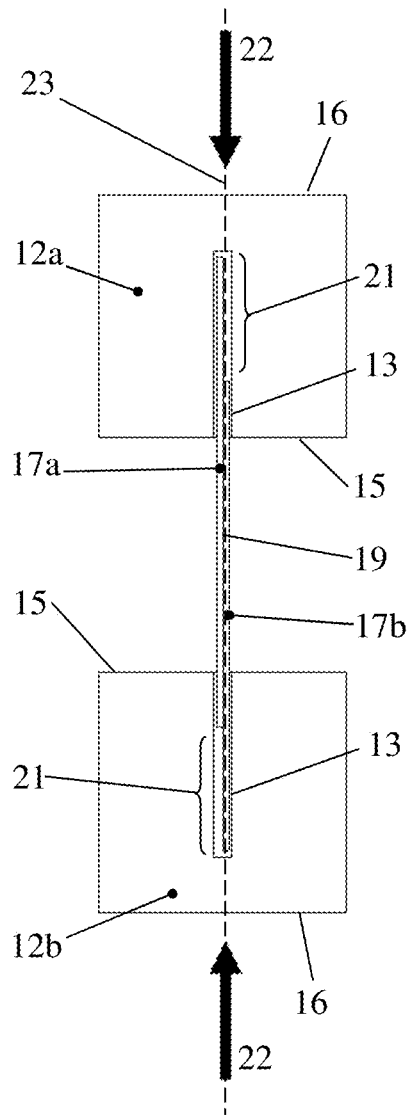
FIGS. 6 and 7 show in different views testing of the strength of an adhesive bonding two specimen elements according to FIG. 5 including two transmission elements according to FIG. 4.
Figure 7:
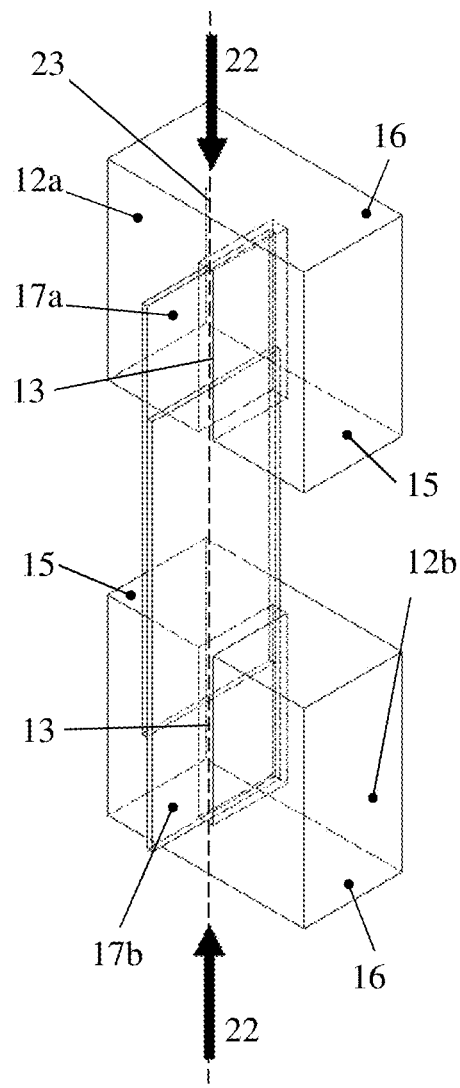

FIGS. 6 and 7 show in different views testing of the strength of an adhesive 19 bonding two specimen elements 17a and 17b according to FIG. 5 including two transmission elements 12a and 12b according to FIG. 4.

In order to perform the testing of the strength of the adhesive 19 the exposed section 21 of the specimen element 17a is overlayed with the recess 13 of the transmission element 12a and the exposed section 21 of the specimen element 17b is overlayed with the recess 13 of the transmission element 12b. Depending on the depth of the recesses 13 and the length of the exposed sections 21 the recesses 13 can just overlay a small part of the exposed sections 21 or the whole exposed sections 21 and beyond that.

Via a press not shown forces 22 are applied to the connecting areas 16 of the transmission elements 12a and 12b. The forces 22 are directed towards each other in one action line 23 forcing the transmission elements 12a and 12b towards each other and applying a shear force on the adhesive 19. The forces 22 are measured with a load cell not shown to indicate at which tensile force 22 the adhesive 19 breaks.

In a further more preferred embodiment the press includes a distance measuring system to indicate an elongation of the adhesive 19 parallel to the shear force applied to the adhesive 19.

The invention claimed is:

1. A method for testing the tensile strength of a bonding between two elongated shaped specimen elements comprising the steps of:
   a) providing two essentially U-shaped transmission elements having two legs and a connecting element, wherein the two legs are arranged essentially parallel and spaced apart to each other and connected by the connecting element forming a groove, wherein the legs of each transmission element are engageable with one of the specimen elements and the connecting element is engageable with a press;
   b) bonding said two elongated shaped specimen elements crosswise at bonding areas by means of a bonding agent, wherein the bonding area of each specimen element is situated between two protrusion areas on the specimen element and wherein in the bonding areas the specimen elements overlap each other;
   c) engaging each transmission element with one specimen element by means of the legs of the transmission element via the protrusion areas of the specimen element, so that each specimen element is placed with its bonding area in the groove of one transmission element;
   d) applying a force on the connecting element of each transmission element with a press, wherein the forces are directed towards each other essentially in one action line forcing the transmission elements towards each other and applying a tensile force on the adhesive; and
   e) measuring at least one force applied with a force measurement device.

2. The method according to claim 1, wherein the specimen elements are bonded crosswise at an angle α between 25° and 155° between longitudinal axes of the elongated shaped specimen elements.

3. The method according to claim 1, wherein the transmission elements are made from metal or plastic.

4. The method according to claim 3, wherein the transmission elements are 3D-printed, laser sintered, or CNC milled.

5. The method according to claim 1, wherein the forces are applied to the transmission elements essentially vertically.

6. The method according to claim 1, wherein the two specimen elements provided are made from glass, metal, wood and/or polymer.

7. The method according to claim 1, wherein the press applies the forces on the transmission elements via a drive system which includes an electric motor with or without a transmission, a hydraulic cylinder, a pneumatic cylinder and/or a transmission drivable by hand.

8. The method according to claim 1, wherein the adhesive is selected from the group consisting of liquid adhesives, epoxide based adhesives, acrylate based adhesives, silicon based adhesives, double sided tape, self-assembly monolayers, ultra violet adhesive, cement, polyurethane foam, and combinations thereof.

9. The method according to claim 8, wherein the self-assembly monolayers are selected from the group consisting of APTES, MPTS, and GPTMS.

10. The method according to claim 1, wherein the specimen elements are bonded crosswise at an angle α of 90° between longitudinal axes of the elongated shaped specimen elements.

* * * * *